United States Patent
Conlin et al.

(10) Patent No.: US 11,726,005 B2
(45) Date of Patent: Aug. 15, 2023

(54) PRESSURE CONTROLLED AUTO BRAKING FOR DYNAMIC VEHICLE TEST (DVT)

(71) Applicant: GM GLOBAL TECHNOLOGY OPERATIONS LLC, Detroit, MI (US)

(72) Inventors: Elizabeth A Conlin, Waterford, MI (US); Jason J Opolka, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 17/448,764

(22) Filed: Sep. 24, 2021

(65) Prior Publication Data
US 2023/0096428 A1 Mar. 30, 2023

(51) Int. Cl.
*G01M 17/007* (2006.01)
(52) U.S. Cl.
CPC .............. *G01M 17/0072* (2013.01)
(58) Field of Classification Search
CPC .............................. G01M 17/0072
See application file for complete search history.

(56) References Cited

U.S. PATENT DOCUMENTS 6,188,948 B1 * 2/2001 Shivler, Jr. ............ G01L 5/282
701/76
6,257,054 B1 * 7/2001 Rostkowski ............ G01L 3/22
73/123
2004/0000191 A1 * 1/2004 Ben-David ....... G01M 17/0074
73/116.06

FOREIGN PATENT DOCUMENTS

FR 3100190 A1 * 3/2021 ............ B60T 17/223

OTHER PUBLICATIONS

Horiba ATS Vulcan Chassis Dynamometer, YouTube, Aug. 2010, https://www.youtube.com/watch?v=0gjnaKr932Y (Year: 2010).*

* cited by examiner

*Primary Examiner* — Eric S. McCall
*Assistant Examiner* — Timothy P Graves
(74) *Attorney, Agent, or Firm* — Lorenz & Kopf LLP (57) ABSTRACT

In accordance with exemplary embodiments, methods and systems are provided for automatically controlling braking of a vehicle during testing. In an exemplary embodiments, a testing assembly is provided that includes a roll test machine and a tester system. The roll test machine includes a flat surface, a plurality of rollers, and one or more optical controllers. The plurality of rollers are configured to engage a vehicle on the flat surface for testing of the vehicle. The one or more optical encoders are configured to generate wheel speed and brake force data for the vehicle during testing of the vehicle. The tester system includes a processor configured to at least facilitate generating instructions for brake pressure to be applied via a braking system of the vehicle during the testing of the vehicle.

20 Claims, 5 Drawing Sheets

PRESSURE CONTROLLED AUTO BRAKING FOR DYNAMIC VEHICLE TEST (DVT)

INTRODUCTION

The technical field generally relates to vehicles and, more specifically, to methods and systems for controlled braking of vehicles during vehicle tests.

Certain systems exist today for testing vehicles during braking of the vehicles. However, such existing vehicle systems may not always provide optimal braking and associated testing, for example in situations in which different testing operators may apply brake pedals differently, and/or for example for certain vehicles that may not have brake pedals (e.g., certain autonomous vehicles).

Accordingly, it is desirable to provide improved methods and systems for controlled braking of vehicles during testing. Furthermore, other desirable features and characteristics of the present disclosure will become apparent from the subsequent detailed description and the appended claims, taken in conjunction with the accompanying drawings and the foregoing technical field and background.

SUMMARY

In an exemplary embodiment, a method is provided that includes: engaging a vehicle on a roll test machine for testing of the vehicle; providing, via a processor of a tester system, instructions for brake pressure to be applied via a braking system of the vehicle; and receiving, via one or more optical encoders of the roll test machine, calculated data for the vehicle during testing of the vehicle.

Also in an exemplary embodiment, the method further includes applying brake pressure to the vehicle, via braking commands provided by a vehicle processor of the vehicle in accordance with the instructions provided by the processor of the tester system, and via implementation of the braking commands via brake units of the braking system of the vehicle.

Also in an exemplary embodiment, the step of engaging the vehicle includes coupling each of a plurality of inertial rollers to a corresponding one of a plurality of wheels of the vehicle, such that the inertial rollers simulate a road mass for the vehicle.

Also in an exemplary embodiment, the step of engaging the vehicle further includes securing one or more front wheels of the vehicle with respective retainer rollers of the roll test machine as the vehicle is disposed on a flat surface of the roll test machine for testing of the vehicle.

Also in an exemplary embodiment, the step of providing the instructions for the brake pressure includes providing initial instructions for an initial brake pressure and a ramp rate for changing the brake pressure based on predetermined values stored in memory.

Also in an exemplary embodiment, the method further includes: obtaining brake force measurements via the one or more optical encoders of the roll test machine during testing of the vehicle; determining whether the brake force measurements are within a predetermined range; and adjusting the instructions for the brake pressure when the brake force measurements are not within the predetermined range.

Also in an exemplary embodiment, the method further includes: adjusting the instructions to increase the brake pressure when the brake force measurements are less than the predetermined range; and adjusting the instructions to decrease the brake pressure when the brake force measurements are greater than the predetermined range.

Also in an exemplary embodiment, the method further includes implementing, via the processor, a delay in adjustments to the brake pressure for a predetermined amount of time sufficient to allow collection of parameter data for the vehicle during the testing.

Also in an exemplary embodiment, the method further includes determining, via the optical encoder data, whether the vehicle is stationary; wherein the steps of providing the instructions for the brake pressure and the receiving of the calculated wheel speed and brake force data are provided until the vehicle is stationary.

In another exemplary embodiment, a testing assembly is provided that includes a roll test machine and a tester system. The roll test machine includes a flat surface, a plurality of rollers, and one or more optical controllers. The plurality of rollers are configured to engage a vehicle on the flat surface for testing of the vehicle. The one or more optical encoders are configured to generate wheel speed and brake force data for the vehicle during testing of the vehicle. The tester system includes a processor configured to at least facilitate generating instructions for brake pressure to be applied via a braking system of the vehicle during the testing of the vehicle.

Also in an exemplary embodiment, the tester system is configured to be coupled to a vehicle processor of the vehicle that is configured to at least facilitate providing commands for applying brake pressure to the vehicle and that are implemented via brake units of a braking system of the vehicle.

Also in an exemplary embodiment, the plurality of rollers include a plurality of inertial rollers, each of the plurality of inertial rollers configured to engage a corresponding one of a plurality of wheels of the vehicle, such that the inertial rollers simulate a road mass for the vehicle.

Also in an exemplary embodiment, the plurality of rollers further include one or more of the following: front retainer rollers for securing one or more front wheels of the vehicle, front intermediate retainer rollers for securing one or more front wheels of the vehicle, rear intermediate retainer rollers for securing one or more rear wheels of the vehicle, or rear intermediate retainer rollers for securing the one or more rear wheels of the vehicle, as the vehicle is disposed on the flat surface of the roll test machine for testing of the vehicle.

Also in an exemplary embodiment, the processor is further configured to provide initial instructions for an initial brake pressure and a ramp rate for changing the brake pressure based on predetermined values stored in memory.

Also in an exemplary embodiment, the one or more optical encoders are configured to obtain brake force measurements for the vehicle during testing of the vehicle; and the processor is configured to at least facilitate: determining whether the brake force measurements are within a predetermined range; and adjusting the instructions for the brake pressure when the brake force measurements are not within the predetermined range.

Also in an exemplary embodiment, the processor is further configured to at least facilitate: adjusting the instructions to increase the brake pressure when the brake force measurements are less than the predetermined range; and adjusting the instructions to decrease the brake pressure when the brake force measurements are greater than the predetermined range.

Also in an exemplary embodiment, the processor is further configured to at least facilitate implementing a delay in adjustments to the brake pressure for a predetermined amount of time sufficient to allow collection of parameter data for the vehicle during the testing.

Also in an exemplary embodiment, the processor is further configured to at least facilitate: determining, via the calculated encoder wheel speed data, whether the vehicle is stationary; and providing the instructions for the brake pressure and the receiving of the calculated encoder wheel speed and brake force data are provided until the vehicle is stationary.

In a further exemplary embodiment, a system is provided that incudes a vehicle and a testing assembly. The vehicle includes a braking system and a control system. The control system is coupled to the braking system, and includes a vehicle processor. The testing assembly includes a roll test machine and a tester system. The roll test machine includes a flat surface, a plurality of rollers, and one or more optical controllers. The plurality of rollers are configured to engage the vehicle on the flat surface for testing of the vehicle. The one or more optical encoders are configured to generate wheel speed and brake force data for the vehicle during testing of the vehicle. The tester system includes a processor configured to at least facilitate generating instructions for brake pressure to be applied via a braking system of the vehicle during the testing of the vehicle.

Also in an exemplary embodiment: the one or more optical encoders are configured to calculate brake force measurements for the vehicle during testing of the vehicle; and the tester system processor is configured to at least facilitate: determining whether the brake force measurements are within a predetermined range; and adjusting the instructions for the brake pressure when the brake force measurements are not within the predetermined range.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
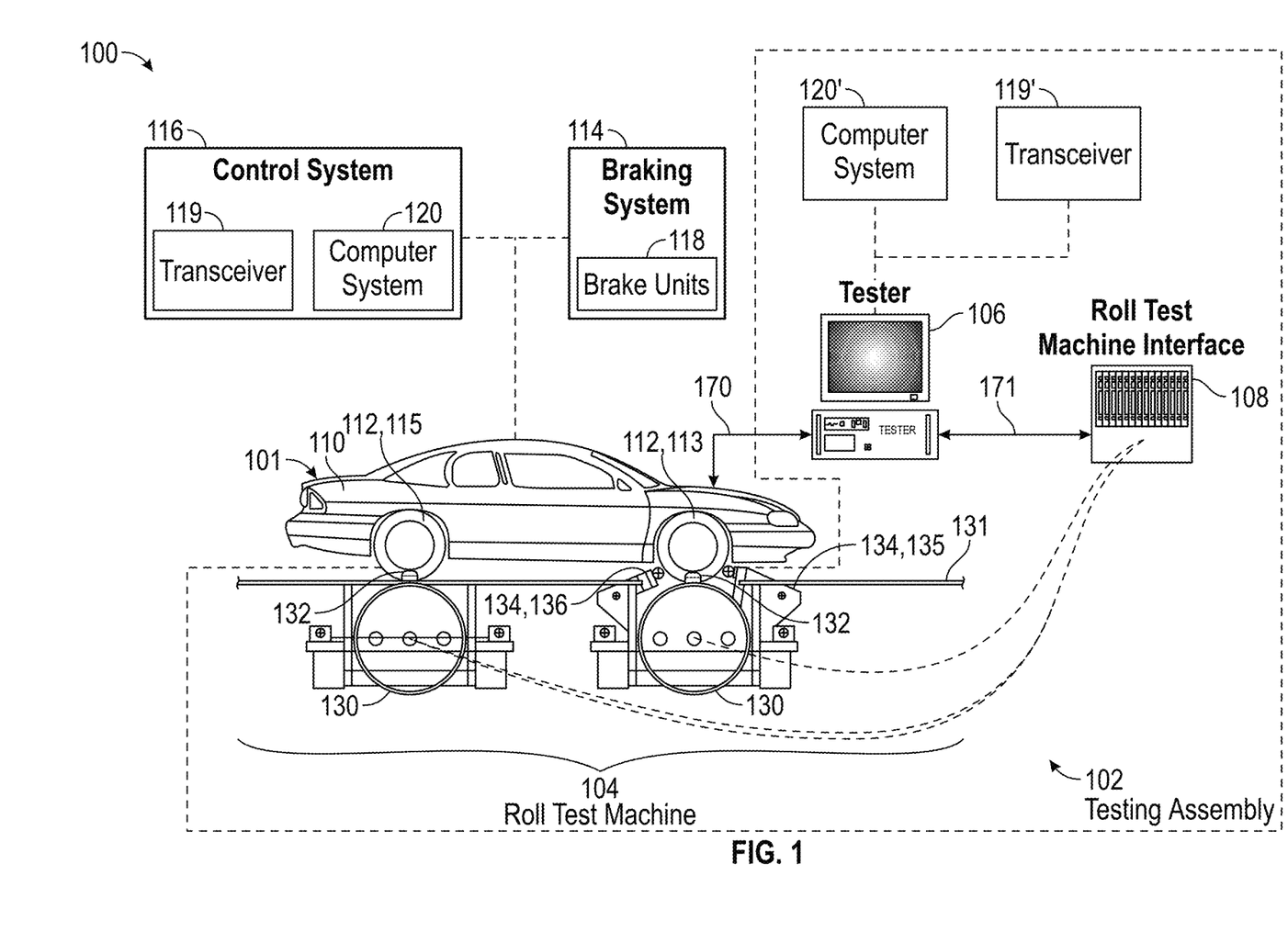
FIG. 1 is a functional diagram of a system that includes a vehicle along with a testing assembly that includes a roll test machine, a tester system, and a roll test machine interface that controls braking of the vehicle during vehicle testing, in accordance with exemplary embodiments.

FIG. 1 illustrates a system 100 that includes a vehicle 101 and a testing assembly 102, in accordance with exemplary embodiments. As described in greater detail further below, the testing assembly 102 includes a roll test machine 104, a tester system 106, and a roll test machine interface 108 for controlling braking of the vehicle 101 during testing for a dynamic vehicle test (DVT), in accordance with exemplary embodiments.

In various embodiments, the vehicle 101 includes an automobile. The vehicle 101 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 101 may also comprise a motorcycle or other vehicle, such as aircraft, spacecraft, watercraft, and so on, and/or one or more other types of mobile platforms (e.g., a robot and/or other mobile platform).

As depicted in FIG. 1, the vehicle includes a body 110 that substantially encloses other components of the vehicle 101. The vehicle 101 also includes a plurality of wheels 112. The wheels 112 are each rotationally coupled to a chassis (not depicted) near a respective corner of the body 110 to facilitate movement of the vehicle 101. In one embodiment, the vehicle 101 includes four wheels 112, namely two front wheels 113 and two rear wheels 115, although this may vary in other embodiments (for example for trucks and certain other vehicles).

Also as depicted in various embodiments, the vehicle 101 also includes (among various other devices and systems) a braking system 114 and a control system 116. In various embodiments, the braking system 114 includes one or more brake units 118 that provide braking for the vehicle 101. In various embodiments, the brake units 118 may include one or more friction, hydraulic, electric, electromagnetic, and/or other different types of brake units.

In various embodiments, the control system 116 comprises a brake control system that controls the braking system 114. Also in various embodiments, the control system 116 includes a transceiver 119 and a computer system 120.

In various embodiments, the transceiver 119 is disposed within or on the body 110 of the vehicle 101, and is configured for communicating with the tester system 106, and in certain embodiments for communicating with the braking system 114 and/or one or more other vehicle systems. In certain embodiments, such communications may be made via one or more wired connections, such as a vehicle CAN bus for communications within the vehicle 101 and/or for a temporary wired connection with the tester system 106. In certain embodiments, certain of these communications may utilize one or more wireless connections and/or networks via the transceiver 119.

Also in various embodiments, the computer system 120 controls operation of the control system 116 and the braking system 114. In various embodiments, the computer system 120 is disposed within body 110 of the vehicle 101. Also in various embodiments, the computer system 120 implements instructions from and provides feedback for the tester system 106, along with other steps of the process 300 described further below in connection with FIG. 3.

Figure 2:
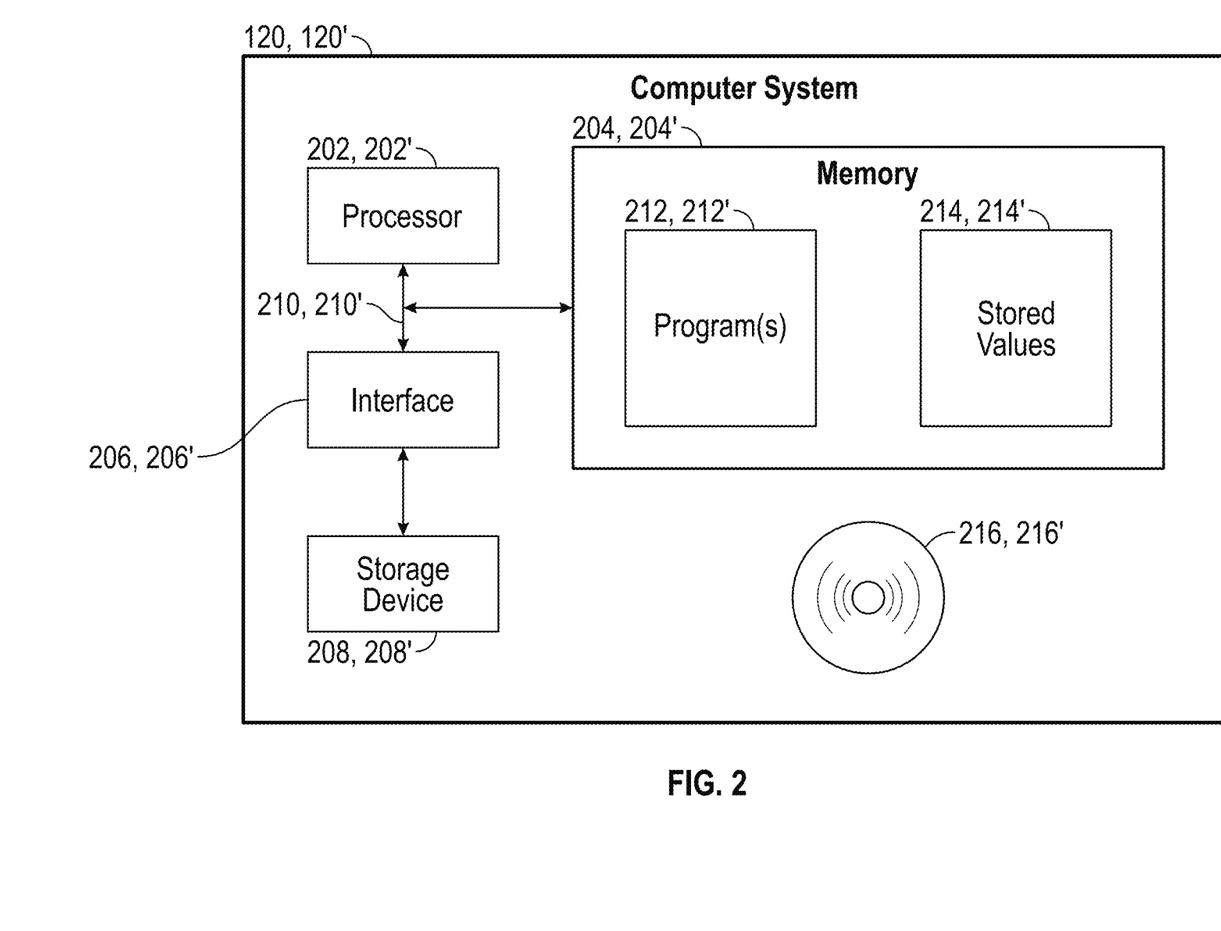
FIG. 2 is a functional diagram of computer system(s) that can be implemented in connection with one or more of the components of the system of FIG. 1, such as a brake control system of the vehicle of FIG. 1 and the tester system of FIG. 1, in accordance with exemplary embodiments.

With reference to FIG. 2, an exemplary computer system 120 is illustrated that can be utilized as part of the control system 116 in accordance with exemplary embodiments. As depicted in FIG. 2, in accordance with an exemplary embodiment the computer system 120 includes a processor 202, a memory 204, an interface 206, a storage device 208, and a computer bus 210.

It will be appreciated that the computer system 120 may otherwise differ from the embodiment depicted in FIG. 2. For example, the computer system 120 may be coupled to or may otherwise utilize one or more remote computer systems and/or other control systems.

In the depicted embodiment, the computer system 120 includes a processor 202, a memory 204, an interface 206, a storage device 208, and a bus 210. The processor 202 performs the computation and control functions of the computer system 120, and may comprise any type of processor or multiple processors, single integrated circuits such as a microprocessor, or any suitable number of integrated circuit devices and/or circuit boards working in cooperation to accomplish the functions of a processing unit. During operation, the processor 202 executes one or more programs 212 contained within the memory 204 and, as such, controls the general operation of the computer system 120 and the computer system of the computer system 120, generally in executing the processes described herein, such as the process 300 discussed further below in connection with FIG. 3.

The memory 204 can be any type of suitable memory. For example, the memory 204 may include various types of dynamic random access memory (DRAM) such as SDRAM, the various types of static RAM (SRAM), and the various types of non-volatile memory (PROM, EPROM, and flash). In certain examples, the memory 204 is located on and/or co-located on the same computer chip as the processor 202. In the depicted embodiment, the memory 204 stores the above-referenced program 212 along with and one or more stored values 214 (e.g., including, in various embodiments, one or more threshold values for controlling braking during vehicle testing).

The bus 210 serves to transmit programs, data, status and other information or signals between the various components of the computer system of the computer system 120. The interface 206 allows communication to the computer system of the computer system 120, for example with the transceiver 119 and/or the tester system 106, and/or with a system driver and/or another computer system, and can be implemented using any suitable method and apparatus. The interface 206 can include one or more network interfaces to communicate with other systems or components. The interface 206 may also include one or more network interfaces to communicate with technicians, and/or one or more storage interfaces to connect to storage apparatuses, such as the storage device 208.

The storage device 208 can be any suitable type of storage apparatus, including various different types of direct access storage and/or other memory devices. In one exemplary embodiment, the storage device 208 comprises a program product from which memory 204 can receive a program 212 that executes one or more embodiments of one or more processes of the present disclosure, such as the steps of the process 300 discussed further below in connection with FIG. 3. In another exemplary embodiment, the program product may be directly stored in and/or otherwise accessed by the memory 204 and/or a disk (e.g., disk 216), such as that referenced below.

The bus 210 can be any suitable physical or logical means of connecting computer systems and components. This includes, but is not limited to, direct hard-wired connections, fiber optics, infrared and wireless bus technologies. During operation, the program 212 is stored in the memory 204 and executed by the processor 202.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 202) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the computer system 120 may also otherwise differ from the embodiment depicted in FIG. 2, for example in that the computer system of the computer system 120 may be coupled to or may otherwise utilize one or more remote computer systems and/or other control systems.

With reference back to FIG. 1, in various embodiments, the roll test machine 104 is configured to facilitate positioning and braking of the vehicle 101 while the vehicle is being tested under a dynamic vehicle test (DVT). As depicted embodiment, the roll test machine 104 includes a flat surface 131 and a plurality of inertial rollers 130, optical encoder 132, and retainer rollers 134 in various embodiments.

In various embodiments, the vehicle 101 is driven onto the flat surface 131 for testing, and is then retained by the retainer rollers 134 of the roll test machine 104. In various embodiments, the vehicle 101 is held in place on the flat surface by the retainer rollers 134. In the embodiment depicted in FIG. 1, the retainer rollers 134 comprise a front retainer roller 135 and a front intermediate retainer roller 136 that secure each of the front wheels 113 of the vehicle 101, and thereby hold the vehicle 101 in place on the flat surface 131 for testing on the inertial rollers 130.

Figure 4A:
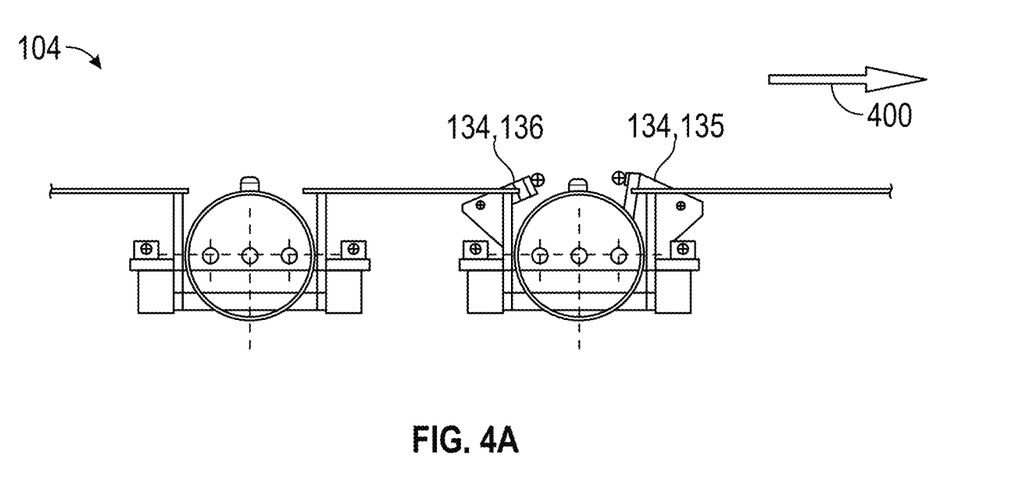
FIGS. 4A-4E depict exemplary implementations of the system and process of FIGS. 1 and 3, with respect to placement of retainer rollers used therein in connection with various embodiments.
Figure 4B:
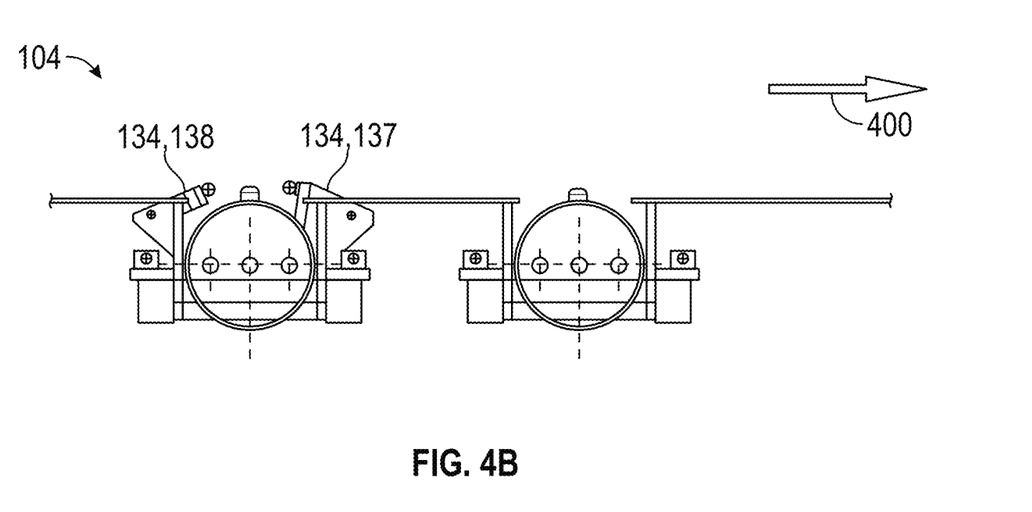
Figure 4C:
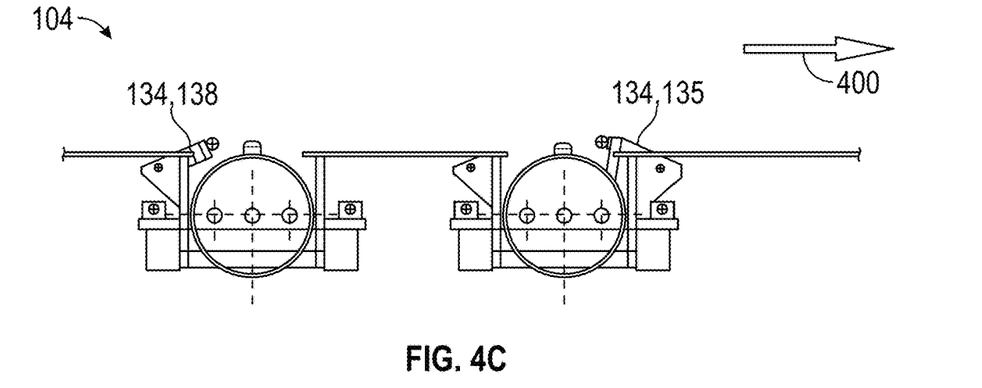
Figure 4D:
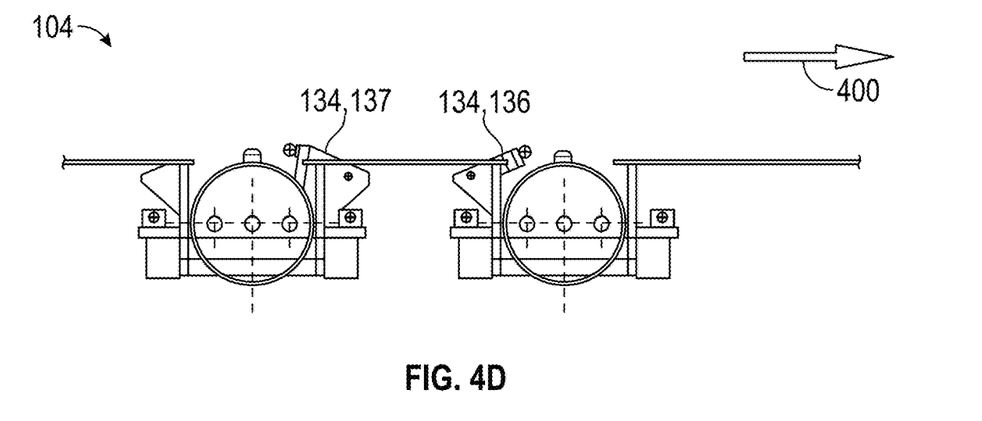
Figure 4E:
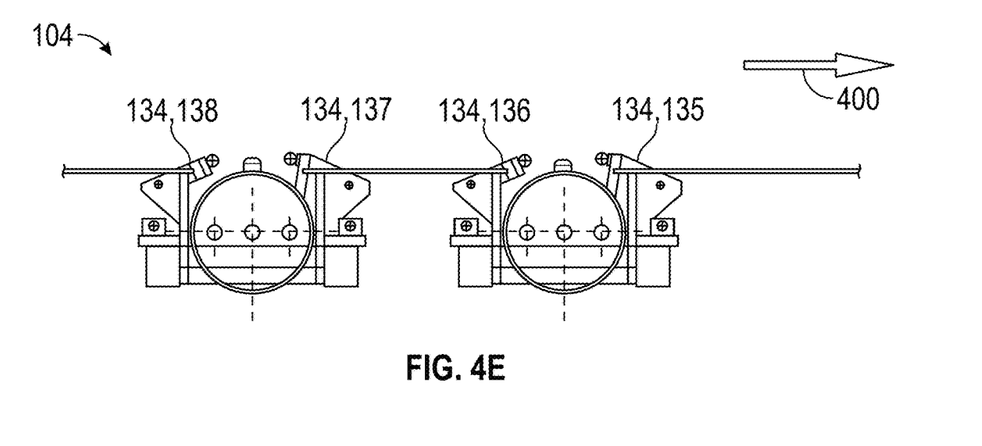

In various embodiments, the number and placement of the retainer rollers 134 may vary. For example, FIGS. 4A-4E depict certain exemplary embodiments that may be implemented. For example, in various embodiments, the vehicle 101 may be secured by retainer rollers 134 comprising the following (among other possible variations): (i) front retainer rollers 135 and front intermediate retainer rollers 136 that secure each of the front wheels 113 of the vehicle 101 (e.g., as depicted in FIG. 4A, and consistent with the embodiment of FIG. 1); (ii) rear retainer rollers 138 and rear intermediate retainer rollers 137 that secure each of the rear wheels 115 (e.g., as depicted in FIG. 4B); (iii) front retainer rollers 135 that secure the front wheels 113 and rear retainer rollers 138 that secure the rear wheels 115 (e.g., as depicted in FIG. 4C); (iv) front intermediate retainer rollers 136 that secure the front wheels 113 and rear intermediate retainer rollers 137 that secure the rear wheels 115 (e.g., as depicted in FIG. 4D); and (v) front retainer rollers 135 and front intermediate retainer rollers 136 that secure the front wheels 113, and rear retainer rollers 138 and rear intermediate retainer rollers 137 that secure the rear wheels 115 (e.g., as depicted in FIG. 4E).

FIGS. 4A-4E depict a front direction 400 in each diagram as a reference point, with the front direction 400 pointing toward a front of the roll test machine 104. Also as depicted in FIGS. 4A-4E, in various embodiments: the front retainer rollers 135 secure the front wheels 113 from a front side of each front wheel 113; the front intermediate retainer rollers 136 secure the front wheels 113 from a rear side of each front wheel 113; the rear intermediate retainer rollers 137 secure the rear wheels 115 from a front side of each rear wheel 115; and the rear retainer rollers 138 secure the rear wheels 115 from a rear side of each rear wheel 115.

With reference back to FIG. 1, in various embodiments the inertial rollers 130 simulate road mass for the vehicle 101 as the vehicle 101 is being tested. In various embodiments, an inertial roller 130 is provided for each of the wheels 112 of the vehicle 101, and each inertial rollers 130 is configured to be coupled to a respective one of the wheels 112 during the vehicle testing. Also in various embodiments, the wheels 112 of the vehicle 101 roll on the inertial rollers 130 as the vehicle 101 is being tested, and as the vehicle 101 is being retained on the flat surface 131 by the front retainer rollers 134.

Also in various embodiments, the optical encoders 132 on the end shaft of the inertia roller 130 obtain speed measurements and provide corresponding feedback regarding the vehicle 101 as the vehicle 101 is being tested on the roll test machine 104. In certain embodiments, the optical encoders 132 are part of or coupled to the inertial rollers 130, and include wheel speed measurements and force calculations. In various embodiments, during vehicle testing, one or more optical encoders are coupled to each of the wheels 112 as the vehicle 101 is being tested. Also in various embodiments, the optical encoders 132 obtain optical encoder data as to the speeds of the wheels 112 and the individual brake forces applied by the braking system 114 via the wheels 112, and provide encoder data feedback accordingly to the tester system 106 via the roll test machine interface 108 (described further below).

As depicted in FIG. 1, the tester system 106 is coupled (or configured to be coupled) to both the vehicle 101 and the roll test machine 104. In various embodiments, the tester system 106 provides instructions to the control system 116 of the vehicle 101 for controlling braking of the vehicle 101 during testing. Also in various embodiments, the tester system 106 collects optical encoder data from the roll test machine 104 pertaining to the vehicle testing (e.g., in various embodiments, wheel speed measurements, brake force measurements, and/or other data as feedback during the vehicle testing).

In various embodiments, the tester system 106 communicates with the vehicle 101 (including the control system 116 thereof) via one or more first communication networks 170. Also in various embodiments, the tester system 106 communicates with the roll test machine 104 via one or more second communication networks 171 via the roll test machine interface 108. In various embodiments, the first and second communication networks 170, 171 may be wired and/or wireless in nature. Also in various embodiments, the roll test machine interface 108 couples the roll test machine 104 with the tester system 106 via the second communication network 171.

As depicted in FIG. 1, the tester system 106 includes a transceiver 119' and a computer system 120'. In various embodiments, the transceiver 119' communicates with the vehicle 101 via the transceiver 119 thereof, for example via the first communication network 170. Also in certain embodiments, the transceiver 119' of the tester system 106 may also communicate with the roll test machine 104 via the roll test machine interface 108 and the second communication network 171. In addition, in certain embodiments, the transceiver 119' may also communicate with a user and/or with one or more other devices and/or systems, for example with results and/or analysis of the testing of the vehicle 101 and/or actions pertaining thereto.

Also in various embodiments, the computer system 120' controls operation of the tester system 106. In addition, in various embodiments, the computer system 120' facilitates control of the braking of the vehicle 101, the collection of testing data and implementations pertaining thereto, along with other steps such as those set forth in the process 300 of FIG. 3 and described further below in connection therewith.

As depicted in FIG. 2, in various embodiments the computer system 120' may include a processor 202', memory 204' with stored programs 212' and stored values 214', an interface 206', a storage device 208', and one or more disks 216' and/or other memory and/or devices, such as those described above with respect to the computer system 120 of the control system 116 of the vehicle 101. In various embodiments, the computer system 120' and the components thereof are similar in structure, configuration, and function to the respective components of the computer system 120 described above.

Figure 3:
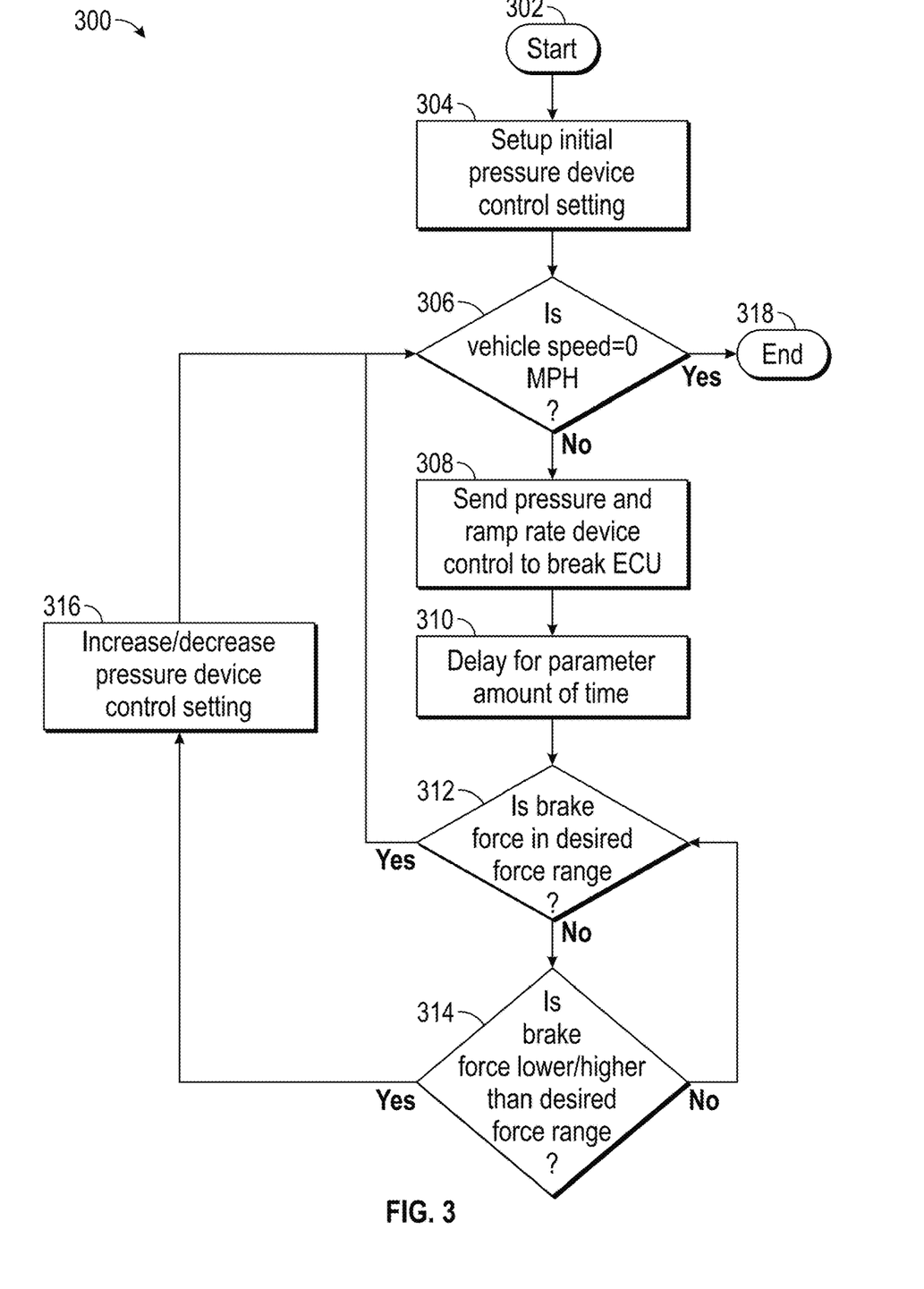
FIG. 3 is a flowchart of a process for controlling braking of a vehicle during testing of the vehicle, and that can be implemented in connection with the vehicle and the testing assembly of FIG. 1, and including the computer system(s) of FIG. 2, in accordance with exemplary embodiments.

FIG. 3 is a flowchart of a process 300 for controlling braking of a vehicle during testing of the vehicle, in accordance with exemplary embodiments. In various embodiments, the process 300 can be implemented in connection with the vehicle 101 and the testing assembly 102 of FIG. 1, and including the computer systems 120, 120' of FIG. 2.

As depicted in FIG. 3, in various embodiments, the process 300 begins at step 302. In one embodiment, the process 300 begins when a vehicle (e.g., the vehicle 101 of FIG. 1) is ready for testing under a dynamic vehicle test (DVT). In certain embodiments, the process 300 is performed at a manufacturing plant, testing facility, or center during manufacture or shortly after manufacture of the vehicle is complete. In one embodiment, the steps of the process 300 are performed continuously during testing of the vehicle.

As depicted in FIG. 3, an initial pressure device control setting is established (step 304). In certain embodiments, the initial pressure device control setting is set by the tester system 106 of FIG. 1 (e.g., the processor 202' thereof of FIGS. 1 and 2) as to an initial amount of brake pressure to be applied for the vehicle 101. In certain embodiments, the processor 202' of the tester system 106 provides instructions accordingly to the corresponding processor 202 of the control system 116 of the vehicle 101, which commands the braking system 114 to provide brake pressure for the vehicle 101 in the amount corresponding to the initial pressure device control setting. Also in certain embodiments, the initial pressure device control setting comprises a default value, for example stored in a computer memory 204, 204' of the vehicle 101 and/or tester system 106 as one or more stored values 214, 214' thereof.

In various embodiments, a determination is made as to whether the vehicle is stationary (step 306). In various embodiments, during step 306, a determination is made as to whether a speed of the vehicle is equal to zero. In various embodiments, this determination is made by the processor 202' of the tester system 106 using wheel speed data from the optical encoders 132 of the roll test machine 104.

If it is determined that the vehicle speed is equal to zero, then the process terminates at step 318.

Conversely, if it is determined that the vehicle speed is not equal to zero, then the process proceeds instead to step 308, described below.

During step 308, pressure and ramp rate settings are provided. Specifically, in various embodiments, pressure commands are provided for braking of the vehicle 101, along with commands for steadily increasing braking for the vehicle 101 via the ramp rate. In certain embodiments, the pressure commands and ramp rate are set by the tester system 106 of FIG. 1 (e.g., the processor 202' thereof of FIGS. 1 and 2), and instructions for implementation of the pressure commands and ramp rate are provided to the corresponding processor 202 of the control system 116 of the vehicle 101, which commands the braking system 114 to provide brake pressure for the vehicle 101 in the amount corresponding to the pressure commands and ramp rate. Also in certain embodiments, the pressure commands and ramp rate are stored in a computer memory 204, 204' of the vehicle 101 and/or tester system 106 as one or more stored values 214, 214' thereof.

Also in various embodiments, during step 308, brake pressure is applied for the vehicle 101 via the brake units 118 of FIG. 1, in accordance with instructions provided by the control system 116 that are in turn based on instructions provided thereto by the tester system 106.

Also in various embodiments, a delay is implemented (step 310). In various embodiments, a delay is implemented for changes in braking pressure based on instructions provided by the processor 202' of the tester system 106 to the corresponding processor 202 of the vehicle's control system 116 for controlling the braking system 114. In certain embodiments, the delay is provided for a predetermined amount of time, during which the amount of brake pressure is unchanged, so that sufficient testing data may be obtained for the vehicle 101 at each of the different brake pressures. In certain embodiments, the predetermined amount of time for the delay is stored in a computer memory 204, 204' of the vehicle 101 and/or tester system 106 as one or more stored values 214, 214' thereof.

Brake force for the vehicle is measured and analyzed (step 312). In various embodiments, brake forces are measured by optical encoders 132 of FIG. 1 with respect to each of the wheels 112. Also in various embodiments, the measured brake forces are provided to the tester system 106 for analysis. In addition, in various embodiments, the computer system 120' (e.g., the processor 202' thereof) determines whether the brake forces are within a predetermined desired force range such as 200 to 375 foot pounds of force. In certain embodiments, the predetermined force range is stored in a computer memory 204, 204' of the tester system 106 as one or more stored values 214, 214' thereof.

If it is determined that the measured brake force is in the desired range, then the process returns to step 306. In various embodiments, the process continues in a new iteration of steps 306-312 so long as the vehicle speed does not equal zero (as determined in step 306) or the brake force deviates from the desired range (as determined in step 312). As noted above, when the vehicle speed does equal zero as determined during an iteration of step 306, the process terminates at step 318 in various embodiments. In addition, also in various embodiments, if it is determined during an iteration of step 312 that the brake force is no longer in the desired range, the process then proceeds to step 314, described below.

During step 314, a determination is made as to whether the brake force is higher or lower than the desired range. In various embodiments, this determination is made by the processor 202' of the tester system 106.

In various embodiments, if the brake force is determined to now be within the desired range, then the process returns to step 312, described above. Conversely, also in various embodiments, if the brake force is determined to be lower or higher than the desired range, then the process proceeds instead to step 316, described below.

In various embodiments, during step 316, the braking pressure is increased or decreased. In various embodiments, the processor 202' of the tester system 106 provides instructions to the processor 202 of the vehicle's control system 116 to increase or decrease the brake pressure based on whether the current measured brake force is less than or greater than the desired range, respectively. Also in various embodiments, these instructions are implemented via the braking system with increased or decreased brake pressure being applied via the brake units 118 of FIG. 1. Specifically, in various embodiments: (i) increased brake pressure is applied when the current measured brake force is less than the desired range; and (ii) decreased brake pressure is applied when the current measured brake force is greater than the desired range.

In various embodiments, the process then returns to step 306 in a new iteration. In various embodiments, steps 306-316 thereafter repeat until a determination is made during an iteration of step 306 that the vehicle speed is equal to zero, at which point the process terminates at step 318. Also in various embodiments, as the various steps of the process 300 are performed, the tester system 106 continuously monitor 104 roll test machine data for testing of the vehicle 101 as the braking is applied. During the brake to zero event, the test system 106 uses data from the roll test machine 104 to determine how much brake force was achieved, and brake balances side to side and front to rear.

Accordingly, methods and systems are provided for controlling vehicle braking during testing of the vehicle, that automatically simulate braking stopping of the vehicle without application of a brake pedal. In various embodiments, a testing assembly, including a roll test machine and a tester, are utilized in connection with a control system of the vehicle in order to automatically control braking of the vehicle during vehicle testing. Also in various embodiments, the disclosed methods and systems provide for streamlined and repeatable testing of vehicles during braking for vehicles that may not include brake pedals. In addition, also in various embodiments, the disclosed methods and systems provide for streamlined, repeatable, and potentially more consistent testing of vehicles during braking for vehicles that do have brake pedals, for example by helping to avoid potentially inconsistent application of the brake pedal by human braking operators that would otherwise be needed without the disclosed methods and systems of the present Application.

It will be appreciated that the systems, vehicles, and methods may vary from those depicted in the Figures and described herein. For example, the system 100, including the vehicle 101 and testing assembly 102 of FIG. 1, and/or components thereof of FIGS. 1 and 2 may vary in different embodiments. It will similarly be appreciated that the steps of the process 300 may differ from that depicted in FIG. 3, and/or that various steps of the process 300 may occur concurrently and/or in a different order than that depicted in FIG. 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
engaging a vehicle on a roll test machine for testing of the vehicle;
providing, via a processor of a tester system, instructions for brake pressure to be applied via a braking system of the vehicle; and
receiving, via one or more optical encoders of the roll test machine, calculated data for the vehicle during testing of the vehicle,
wherein the step of providing the instructions for the brake pressure comprises:
providing, to the braking system via a vehicle processor, initial instructions for an initial brake pressure and a ramp rate for changing the brake pressure based on predetermined values stored in memory.

2. The method of claim 1, further comprising:
applying brake pressure to the vehicle, via braking commands provided by a vehicle processor of the vehicle in accordance with the instructions provided by the processor of the tester system, and via implementation of the braking commands via brake units of the braking system of the vehicle.

3. The method of claim 1, wherein the step of engaging the vehicle comprises coupling each of a plurality of inertial rollers to a corresponding one of a plurality of wheels of the vehicle, such that the inertial rollers simulate a road mass for the vehicle.

4. The method of claim 3, wherein the step of engaging the vehicle further comprises securing one or more front wheels of the vehicle with respective retainer rollers of the roll test machine as the vehicle is disposed on a flat surface of the roll test machine for testing of the vehicle.

5. The method of claim 1, further comprising:
obtaining brake force measurements via the one or more optical encoders of the roll test machine during testing of the vehicle;
determining whether the brake force measurements are within a predetermined range; and
adjusting the instructions for the brake pressure when the brake force measurements are not within the predetermined range.

6. The method of claim 5, further comprising:
adjusting the instructions to increase the brake pressure when the brake force measurements are less than the predetermined range; and
adjusting the instructions to decrease the brake pressure when the brake force measurements are greater than the predetermined range.

7. The method of claim 1, further comprising:
implementing, via the processor, a delay in adjustments to the brake pressure for a predetermined amount of time sufficient to allow collection of parameter data for the vehicle during the testing.

8. The method of claim 1, further comprising:
determining, via the optical encoder data, whether the vehicle is stationary;
wherein the steps of providing the instructions for the brake pressure and the receiving of the calculated wheel speed and brake force data are provided until the vehicle is stationary.

9. A testing assembly comprising:
a roll test machine comprising:
a flat surface;
a plurality of rollers configured to engage a vehicle on the flat surface for testing of the vehicle; and
one or more optical encoders configured to generate wheel speed and brake force data for the vehicle during testing of the vehicle; and
a tester system comprising a processor configured to at least facilitate generating instructions for brake pressure to be applied via a braking system of the vehicle during the testing of the vehicle;
wherein the processor is further configured to provide, to the braking system via a vehicle processor, initial instructions for an initial brake pressure and a ramp rate for changing the brake pressure based on predetermined values stored in memory.

10. The testing assembly of claim 9, wherein the tester system is configured to be coupled to a vehicle processor of the vehicle that is configured to at least facilitate providing commands for applying brake pressure to the vehicle and that are implemented via brake units of a braking system of the vehicle.

11. The testing assembly of claim 9, wherein the plurality of rollers include a plurality of inertial rollers, each of the plurality of inertial rollers configured to engage a corresponding one of a plurality of wheels of the vehicle, such that the inertial rollers simulate a road mass for the vehicle.

12. The testing assembly of claim 9, wherein the plurality of rollers further include one or more of the following: front retainer rollers for securing one or more front wheels of the vehicle, front intermediate retainer rollers for securing one or more front wheels of the vehicle, rear intermediate retainer rollers for securing one or more rear wheels of the vehicle, or rear intermediate retainer rollers for securing the one or more rear wheels of the vehicle, as the vehicle is disposed on the flat surface of the roll test machine for testing of the vehicle.

13. The testing assembly of claim 9, wherein:
the one or more optical encoders are configured to obtain brake force measurements for the vehicle during testing of the vehicle; and
the processor is configured to at least facilitate:
determining whether the brake force measurements are within a predetermined range; and
adjusting the instructions for the brake pressure when the brake force measurements are not within the predetermined range.

14. The testing assembly of claim 13, wherein the processor is further configured to at least facilitate:
adjusting the instructions to increase the brake pressure when the brake force measurements are less than the predetermined range; and
adjusting the instructions to decrease the brake pressure when the brake force measurements are greater than the predetermined range.

15. The testing assembly of claim 9, wherein the processor is further configured to at least facilitate implementing a delay in adjustments to the brake pressure for a predetermined amount of time sufficient to allow collection of parameter data for the vehicle during the testing.

16. The testing assembly of claim 9, wherein the processor is further configured to at least facilitate:
determining, via the calculated encoder wheel speed data, whether the vehicle is stationary; and providing the instructions for the brake pressure and the receiving of the calculated encoder wheel speed and brake force data are provided until the vehicle is stationary.

17. A system comprising:

a vehicle comprising:

a braking system; and a control system coupled to the braking system, the control system including a vehicle processor; and a testing assembly comprising:

a roll test machine comprising:

a flat surface;

a plurality of rollers configured to engage the vehicle on the flat surface for testing of the vehicle; and one or more optical encoders configured to generate wheel speed and brake force data for the vehicle during testing of the vehicle; and a tester system comprising a tester system processor configured to at least facilitate generating instructions for brake pressure to be applied via a braking system of the vehicle during the testing of the vehicle via commands provided to the braking system by the vehicle processor;

wherein:

the one or more optical encoders are configured to calculate brake force measurements for the vehicle during testing of the vehicle; and the tester system processor is configured to at least facilitate:

determining whether the brake force measurements are within a predetermined range; and adjusting the instructions for the brake pressure when the brake force measurements are not within the predetermined range.

18. The system of claim 17, wherein the tester system processor is further configured to provide initial instructions for an initial brake pressure and a ramp rate for changing the brake pressure based on predetermined values stored in memory.

19. The system of claim 18, wherein the vehicle processor is further configured to implement the initial instructions for the initial brake pressure and the ramp rate for changing the brake pressure from the tester system processor.

20. The testing assembly of claim 17, wherein the tester system processor is further configured to at least facilitate implementing a delay in adjustments to the brake pressure for a predetermined amount of time sufficient to allow collection of parameter data for the vehicle during the testing.

* * * * *